(12) United States Patent
Masuda et al.

(10) Patent No.: US 10,113,443 B2
(45) Date of Patent: Oct. 30, 2018

(54) FAILURE DETECTION DEVICE

(71) Applicant: IHI Corporation, Koto-ku (JP)

(72) Inventors: Kouichi Masuda, Tokyo (JP); Hiroyuki Furukawa, Tokyo (JP); Moe Kinoshita, Tokyo (JP)

(73) Assignee: IHI Corporation, Koto-ku (JP)

( * ) Notice: Subject to any disclaimer, the term of this patent is extended or adjusted under 35 U.S.C. 154(b) by 82 days.

(21) Appl. No.: 15/287,918

(22) Filed: Oct. 7, 2016

(65) Prior Publication Data

US 2017/0298759 A1   Oct. 19, 2017

Related U.S. Application Data

(63) Continuation of application No. PCT/JP2015/068691, filed on Jun. 29, 2015.

(30) Foreign Application Priority Data

Sep. 1, 2014   (JP) ................................. 2014-176840

(51) Int. Cl.
*F01D 21/00*  (2006.01)
*F01D 25/00*  (2006.01)
(Continued)

(52) U.S. Cl.
CPC ........... *F01D 21/003* (2013.01); *F01D 25/00* (2013.01); *F02C 7/00* (2013.01); *F02C 7/04* (2013.01);
(Continued)

(58) Field of Classification Search
CPC ............ F01D 21/003; F02C 7/04; F02C 3/04
See application file for complete search history.

(56) References Cited

U.S. PATENT DOCUMENTS 5,548,597 A   8/1996   Kayama et al.
6,356,857 B1   3/2002   Qin et al.
(Continued)

FOREIGN PATENT DOCUMENTS

JP   7-110708   4/1995
JP   2000-18983   1/2000
(Continued)

OTHER PUBLICATIONS

International Search Report dated Aug. 18, 2015 in PCT/JP2015/068691, filed Jun. 29, 2015 ( with English Translation).
(Continued)

*Primary Examiner* — Michael D Lang
(74) *Attorney, Agent, or Firm* — Oblon, McClelland, Maier & Neustadt, L.L.P.

(57) ABSTRACT

The failure detection device includes an accumulated data storage unit 30, a unit space generating module 13, a signal space generating module 14 and a determining module 16, wherein the unit space generating module 13 and the signal space generating module 14 use values as they are for condition sensor values defined as sensor values that affect other sensor values and sensor values that are not affected by the condition sensor values, and use values nondimensionalized by the condition sensor values or values adjusted by the condition sensor values for the other sensor values affected by the condition sensor values, and the determining module 16 compares a distance between the unit space and the signal space and determines presence/absence of a possibility of a failure.

6 Claims, 9 Drawing Sheets

(51) Int. Cl.
*F02C 7/00* (2006.01)
*F02C 9/00* (2006.01)
*F02C 7/04* (2006.01)
*G05B 23/02* (2006.01)
*F02C 3/04* (2006.01)

(52) U.S. Cl.
CPC ............ *F02C 9/00* (2013.01); *G05B 23/0235* (2013.01); *F02C 3/04* (2013.01); *F05D 2220/323* (2013.01); *F05D 2260/80* (2013.01); *F05D 2270/303* (2013.01); *G05B 23/024* (2013.01)

(56) References Cited

U.S. PATENT DOCUMENTS

| | | |
|---|---|---|
| 2002/0183971 A1 | 12/2002 | Wegerich et al. |
| 2002/0193891 A1 | 12/2002 | Ushiku |
| 2003/0149547 A1 | 8/2003 | Nakao et al. |
| 2007/0118270 A1 | 5/2007 | Wiseman et al. |
| 2007/0118338 A1 | 5/2007 | Grichnik et al. |
| 2012/0271587 A1* | 10/2012 | Shibuya ............ G05B 23/0229 702/127 |

FOREIGN PATENT DOCUMENTS

| | | |
|---|---|---|
| JP | 2002-214185 | 7/2002 |
| JP | 2002-522837 | 7/2002 |
| JP | 2004-531815 | 10/2004 |
| JP | 2007-138937 | 6/2007 |
| JP | 2009-520948 | 5/2009 |
| JP | 2010-52009 A | 3/2010 |
| JP | 2010-181188 A | 8/2010 |
| JP | 2010-276339 | 12/2010 |
| JP | 2011-106467 | 6/2011 |
| JP | 4824518 | 11/2011 |
| JP | 4875661 | 2/2012 |
| JP | 5345180 | 11/2013 |
| JP | 2014-35282 | 2/2014 |
| JP | 2014-56598 A | 3/2014 |
| WO | WO 2014/091952 A1 | 6/2014 |

OTHER PUBLICATIONS

Written Opinion dated Aug. 18, 2015 in PCT/JP2015/068691, filed Jun. 29, 2015.
Office Action dated Apr. 24, 2018 in Japanese Patent Application No. 2014-176840, 3 pages.
Extended European Search Report dated May 2, 2018 in Patent Application No. 15837331.6 citing references AA-AB and AP-AQ therein, 7 pages.

* cited by examiner

FIG. 3

| ACQUISITION DATE/TIME | FIRST SENSOR | SECOND SENSOR | THIRD SENSOR | FOURTH SENSOR | ... | FAILURE FLAG |
|---|---|---|---|---|---|---|
| T1 | 15 | 50 | 850 | 95 | ... | 0 |
| T2 | 18 | 70 | 880 | 97 | ... | 0 |
| T3 | 16 | 60 | 860 | 96 | ... | 1 |
| ... | ... | ... | ... | ... | ... | ... |
| Tn | 30 | 80 | 900 | 94 | ... | 0 |

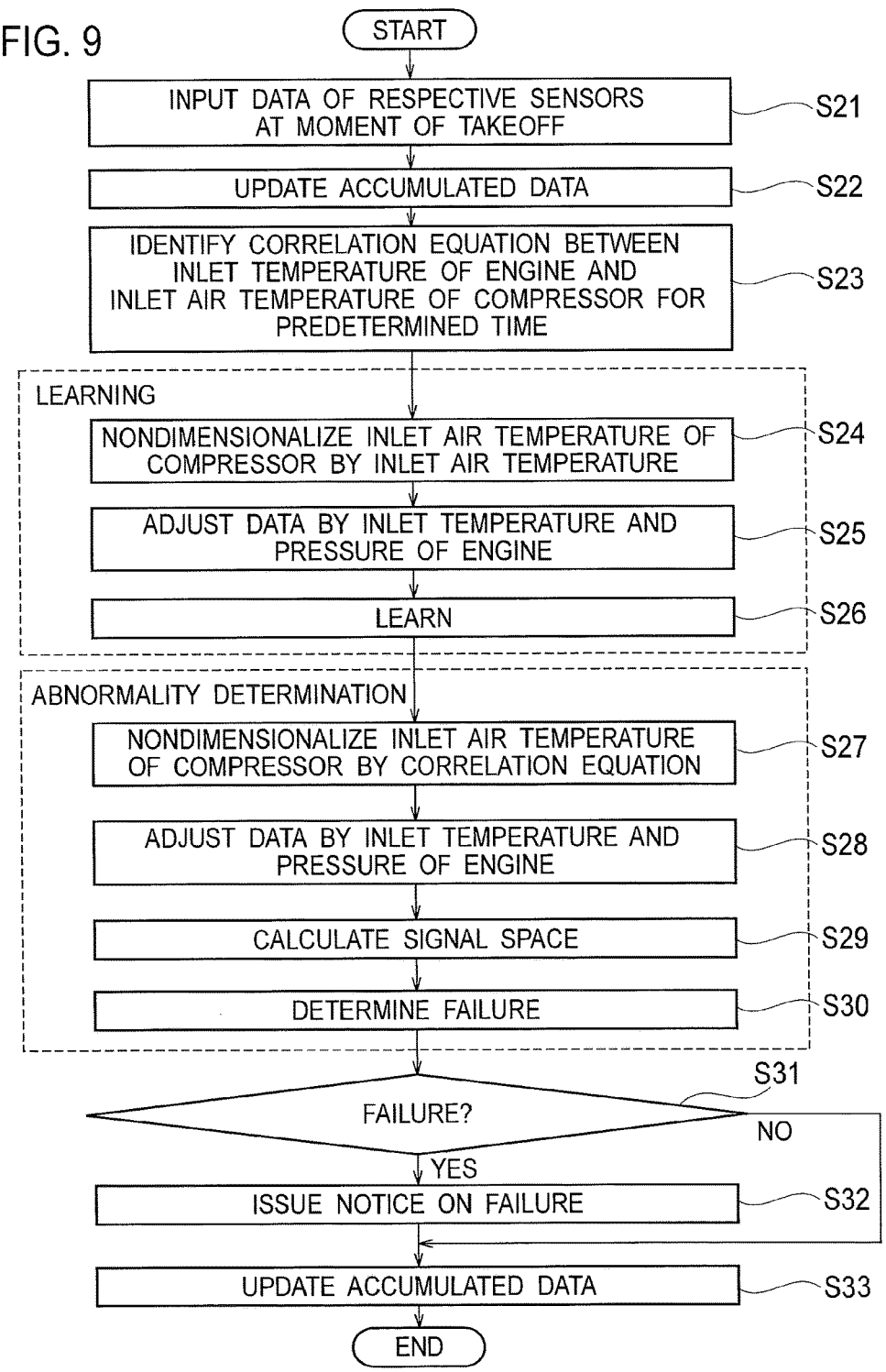

FAILURE DETECTION DEVICE

CROSS REFERENCE TO RELATED APPLICATIONS

This application is a continuation application of international application No. PCT/JP2015/068691 filed Jun. 29, 2015, which claims priority to Japanese Patent Application No. 2014-176840 filed Sep. 1, 2014, each of which is hereby incorporated by reference in their entity.

BACKGROUND

1. Technical Field

The present disclosure relates to a failure detection device that detects a drift failure of a sensor.

2. Description of Related Art

For abnormality detection, there are used technologies such as an MT system (for example, including the MT method (Mahalanobis-Taguchi Method) and the error variance method) and a neural network, which are comprehensive systems of quality engineering. These technologies can also be used for failure detection of a variety of mechanical system. For example, the MT system and the neural network can also be used for failure detection of a plurality of sensors for use in control of a gas turbine engine of an aircraft (for example, refer to Patent Documents 1 and 2).

In a case of detecting such a sensor failure by using the MT method, a Mahalanobis distance, which represents a relationship between a unit space composed of normal data of each of the sensors and a signal space composed of data of an inspection target of each sensor, is calculated, this Mahalanobis distance is compared with a predetermined threshold value, and it is detected whether or not there is a failure in each sensor. Moreover, in a case of detecting the sensor failure by using the error variance method, an error variance distance, which represents a similar relationship between the unit space and the signal space, is calculated, this error variance distance is compared with a predetermined threshold value, and it is detected whether or not the failure occurs in each sensor. Furthermore, in a case of detecting the sensor failure by using the neural network, learning processing is executed by using normal data and abnormal data of each sensor as teacher data, and moreover, abnormality determination processing is executed for the data as the inspection target by using this teacher data, and the failure is detected.

Each of sensor values for use in control of the gas turbine engine of the aircraft is prone to be affected by an environment such as a flight condition (for example, an altitude and a flight speed) and an outside air temperature. Hence, even if each of the sensor values is normal, variance of the data is increased. In this case, a sensor drift failure, which appears owing to a small degree of a value change, is buried in a range of normal values, and is difficult to be detected.

RELATED ART DOCUMENT

Patent Document 1: JP 4824518 B
Patent Document 2: JP 2011-106467 A

SUMMARY

As mentioned above, in the conventional failure detection method, each sensor value is affected by such an environmental change, whereby a small degree of the drift failure of the sensor is difficult to be detected, and it has been apprehended that the detection of the sensor failure may be decreased.

In consideration of the above-described problem, it is an object of the present disclosure to provide a failure detection device that enhances accuracy of the failure detection without being affected by the environmental change.

In order to achieve the foregoing object, a first disclosure includes: input module for receiving values measured by a plurality of sensors which are failure detection targets; an accumulated data storage unit that stores a plurality of sensor values, which were acquired in past, as accumulated data; unit space generating module for generating a unit space by extracting sensor values of a unit space, which are used in an MT system, from the accumulated data storage unit, and by, among the extracted sensor values, with regard to condition sensor values defined as sensor values which affect other sensor values and to sensor values which are not affected by the condition sensor values, using these values as they are, and with regard to the other sensor values affected by the condition sensor values, using values nondimensionalized by the condition sensor values or values adjusted by the condition sensor values; signal space generating module for, when a plurality of sensor values which are the failure detection targets are inputted to the input module, generating a signal space that is an aggregate of diagnosis data, which are used in the MT system, by, among the inputted sensor values, with regard to the condition sensor values and the sensor values which are not affected by the condition sensor values, using these values as they are, and with regard to the other sensor values affected by the condition sensor values, using values nondimensionalized by the condition sensor values or values adjusted by the condition sensor values; and determining module for comparing a distance, which represents a relationship between the unit space generated by the unit space generating module and the signal space generated by the signal space generating module, with a predetermined threshold value, and determining presence/absence of a possibility of a failure of any of the sensors.

A second disclosure includes: input module for receiving values measured by a plurality of sensors provided in a gas turbine engine of an aircraft; accumulated data storage unit that stores values, which are measured by the plurality of sensors at a moment of a takeoff of the aircraft, as accumulated data; correlation equation identifying module for identifying a correlation equation between a value of a first sensor, which measures an inlet temperature of the gas turbine, and a value of a second sensor, which measures an inlet temperature of a compressor, both of the values being stored in the accumulated data storage unit; accumulated data nondimensionalizing module for nondimensionalizing the value of the second sensor, which is stored in the accumulated data storage unit, by the correlation equation identified by the correlation equation identifying module; accumulated data adjusting module for individually adjusting, among respective sensor values stored in the accumulated data storage unit, values of sensors, which are affected by the value of the first sensor, by a value of the first sensor, which is measured simultaneously therewith; unit space calculating module for calculating a unit space, which is used for an MT system by using respective values of the second sensor, which are nondimensionalized by the accumulated data nondimensionalizing module, and values of the respective sensors, which are adjusted by the accumulated data nondimensionalizing module, together with the respective values stored in the accumulated data storage unit; input data nondimensionalizing module for nondimensionalizing values of the second sensor, which are newly inputted to the input module, by the correlation equation identified by the correlation equation identifying module; input data adjusting module for adjusting, among the respective sensor values newly inputted to the input module, the values of the sensors, which are affected by the value of the first sensor, by a newly inputted value of the first sensor; signal space calculating module for calculating a signal space that is an aggregate of diagnosis data, which are used in the MT system, by using the values of the second sensor, which are nondimensionalized by the input data nondimensionalizing module, and the values of the respective sensors, which are adjusted by the input data nondimensionalizing module, together with the respective values newly inputted to the input module; and determining module for comparing a distance, which represents a relationship between the unit space calculated by the unit space calculating module and the signal space calculated by the signal space calculating module, with a predetermined threshold value, and determining presence/absence of a possibility of a failure of any of the sensors.

A third disclosure includes: input module for receiving values measured by a plurality of sensors which are failure detection targets; an accumulated data storage unit that stores a plurality of sensor values, which were acquired in past, as accumulated data; learning module for obtaining teacher data, which include values of a plurality of sensors and states of the respective sensors, by a learning program of a neural network by, among sensor values extracted as the teacher data of the neural network from the accumulated data storage unit, with regard to condition sensor values defined as sensor values which affect other sensor values and to sensor values which are not affected by the condition sensor values, using these values as they are, and with regard to the other sensor values affected by the condition sensor values, using values nondimensionalized by the condition sensor values or values adjusted by the condition sensor values; and determining module for, when a plurality of sensor values which are the failure detection targets are inputted to the input module, generating a signal space that is an aggregate of diagnosis target data by, among the inputted sensor values, with regard to the condition sensor values and the sensor values which are not affected by the condition sensor values, using these values as they are, and with regard to the other sensor values affected by the condition sensor values, using values nondimensionalized by the condition sensor values or values adjusted by the condition sensor values, and determining presence/absence of a possibility of a failure of any of the sensors in response to whether the values of the respective sensors in the generated signal space apply to a relationship obtained by the learning module.

A fourth disclosure includes: input module for receiving values measured by a plurality of sensors provided in a gas turbine engine of an aircraft; accumulated data storage unit that stores values, which are measured by the plurality of sensors at a moment of a takeoff of the aircraft, as accumulated data; correlation equation identifying module for identifying a correlation equation between a value of a first sensor, which measures an inlet temperature of the gas turbine, and a value of a second sensor, which measures an inlet temperature of a compressor, both of the values being stored in the accumulated data storage unit; accumulated data nondimensionalizing module for nondimensionalizing the value of the second sensor, which is stored in the accumulated data storage unit, by the correlation equation identified by the correlation equation identifying module; accumulated data nondimensionalizing module for nondimensionalizing the value of the second sensor, which is stored in the accumulated data storage unit, by the correlation equation identified by the correlation equation identifying module; accumulated data adjusting module for individually adjusting, among respective sensor values stored in the accumulated data storage unit, values of sensors, which are affected by the value of the first sensor, by a value of the first sensor, which is measured simultaneously therewith, and in addition, obtaining relationships between the value of the first sensor and the values of the respective sensors; learning module for obtaining teacher data, which include values of a plurality of sensors and states of the respective sensors, by a learning program of a neural network by using values of the respective sensors stored in the accumulated data storage unit, respective values of the second sensor, which are nondimensionalized by the accumulated data nondimensionalizing module, and values of the respective sensors, which are adjusted by the accumulated data adjusting module; input data nondimensionalizing module for nondimensionalizing a value of the second sensor, which is newly inputted to the input module, by the correlation equation identified by the correlation equation identifying module; input data adjusting module for adjusting, among the respective sensor values newly inputted to the input module, the values of the sensors, which are affected by the value of the first sensor, by a newly inputted value of the first sensor; signal space calculating module for calculating a signal space that is an aggregate of diagnosis data by using the values of the second sensor, which are nondimensionalized by the input data nondimensionalizing module, and the values of the respective sensors, which are adjusted by the input data nondimensionalizing module, together with the respective values newly inputted to the input module; and determining module for comparing the values of the respective sensors in the signal space, which are calculated by the signal space calculating module, with the teacher data obtained by the learning module, and determining presence/absence of a possibility of a failure of any of the sensors.

A fifth disclosure includes notifying module for issuing a notice on a determination result of the determining module.

A sixth disclosure includes input data storage processing module for adding a new value of the sensor, which is inputted to the input module, to accumulated data of the accumulated data storage unit.

In accordance with the present disclosure, such an influence of the environmental change is reduced, and the accuracy of the detection of the sensor failure can be enhanced.

BRIEF DESCRIPTION OF DRAWINGS

FIG. 3 is a view explaining a configuration of accumulated data stored by the failure detection device of FIG. 1.

FIG. 9 is a flowchart explaining processing executed in the failure detection device of FIG. 8.

DETAILED DESCRIPTION OF EMBODIMENTS

A description is made below of failure detection devices according to respective embodiments of the present disclosure by using the drawings. The failure detection devices according to the respective embodiments take, as diagnosis targets, a plurality of sensors which measure a variety of parameter values of components, devices, systems and the like, and detect failures of these sensors by using respective measured values. A description is made below of sensors which measure the respective values of a gas turbine engine provided in an aircraft, the sensors being taken as such diagnosis targets.

First Embodiment

Figure 1:
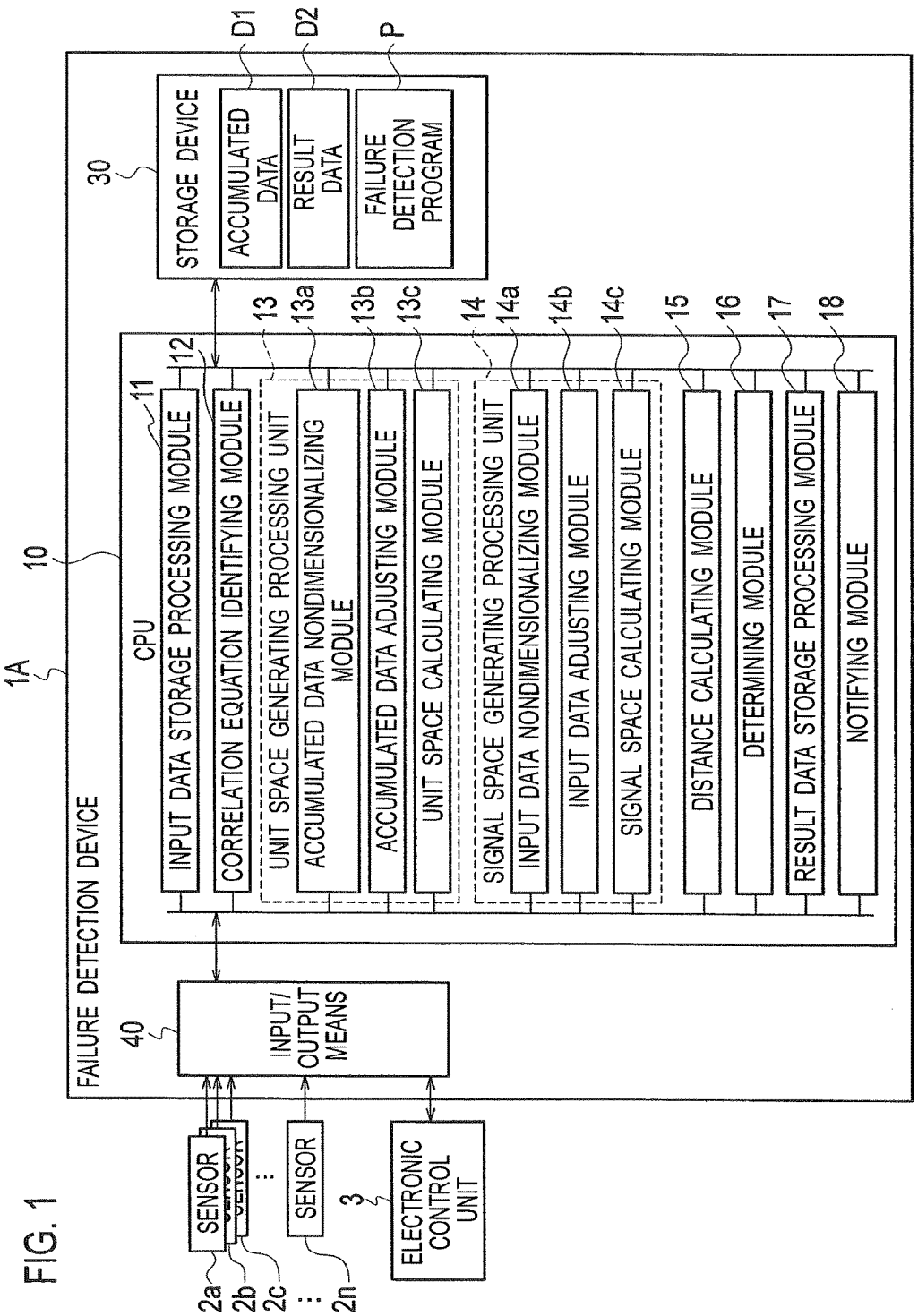
FIG. 1 is a block diagram explaining a failure detection device according to a first embodiment.

As shown in FIG. 1, in the gas turbine engine of the aircraft, a failure detection device 1A according to a first embodiment is connected to a plurality of sensors 2a to 2n which measure the respective values, and to an electronic control unit 3 for use in controlling the gas turbine engine of the aircraft and controlling other devices of the aircraft, and detects whether or not there are failures of the respective sensors 2a to 2n by the error variance method of the MT system by using data inputted from the respective sensors 2a to 2n and the electronic control unit 3, and in addition, detects which of the sensors 2a to 2n may have caused a failure in a case where there is a failure.

The number of sensors connected to the failure detection device 1a is not limited. For example, as the sensors 2a to 2n, there are conceivable: a sensor that measures an inlet temperature of the gas turbine engine; a sensor that measures an inlet temperature of a compressor owned by the gas turbine engine; a sensor that measures an inlet pressure of the gas turbine engine; a sensor that measures a temperature of a turbine blade surface owned by the gas turbine engine; a sensor that measures a temperature of gas exhausted by the gas turbine engine; a sensor that measures an outlet pressure of the compressor owned by the gas turbine engine; a sensor that measures a number of revolutions of a low-pressure turbine owned by the gas turbine engine; a sensor that measures a number of revolutions of a high-pressure turbine owned by the gas turbine engine; a sensor that measures an angle of a variable stator blade owned by the gas turbine engine; a sensor that measures an opening degree of an air bleed valve owned by the gas turbine engine; a sensor that measures a fuel flow rate of the gas turbine engine; and the like.

Figure 2:
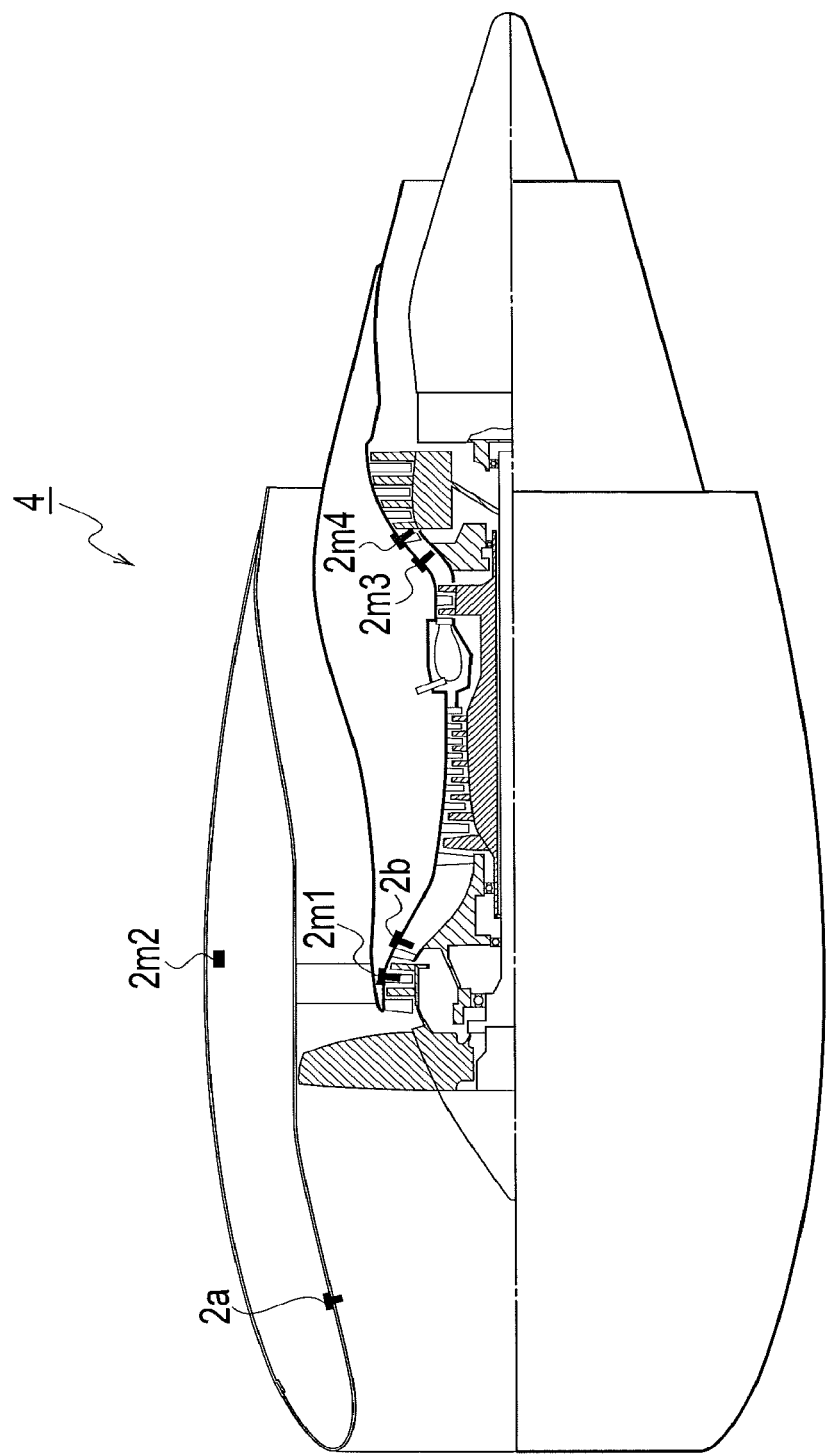
FIG. 2 is a schematic view explaining a gas turbine having sensors taken as inspection targets by the failure detection device of FIG. 1.

The following description is made on the assumption that the "sensor that measures an inlet temperature of the gas turbine engine" is a first sensor 2a, that the "sensor that measures an inlet temperature of a compressor owned by the gas turbine engine" is a second sensor 2b, and that the "sensor that measures an inlet pressure of the gas turbine engine" is a third sensor 2c. FIG. 2 is a side view of gas turbine engine 4, and is a view in which an upper half is shown as a cross section. The respective sensors 2a to 2n are provided in respective portions of this gas turbine engine 4; however, in FIG. 2, only a part of the sensors (2a, 2b, 2m1 to 2m4) are illustrated.

As shown in FIG. 1, the failure detection device 1A includes: input/output module 40 as an interface that executes input/output of data between the sensors 2a to 2n and the electronic control unit 3; input data storage processing module 11 for storing values of the respective sensors 2a to 2n, which are newly measured in a storage device 30; and correlation equation identifying module 12 for identifying a correlation equation between the value of the first sensor 2a and the second sensor 2b. Moreover, the failure detection device 1A includes a unit space generating processing unit 13 that generates a unit space of normal data for use in an MT system by, among the values of the respective sensors 2a to 2n, which were measured in the past, with regard to values of condition sensors defined as sensors which affect values of other sensors and values of sensors which are not affected by the values of the condition sensors, using these values as they are, and with regard to the values of the other condition sensors affected by the values of the condition sensors, using values nondimensionalized by using the values of the condition sensors or values adjusted by using the values of the condition sensors. Furthermore, the failure detection device 1A includes a signal space generating processing unit 14 that generates a signal space that is an aggregate of diagnosis data, which are used in the MT system, by, among the values of the sensors 2a to 2n, which are inputted to the input/output module 40, with regard to the values of the condition sensors and the values of the sensors which are not affected by the values of the condition sensors, using these sensors as they are, and with regard to the values of the other sensors which affect the values of the condition sensors, using the values infinitized by using the values of the condition sensors or the values adjusted by using the values of the condition sensors. Moreover, the failure detection device 1A includes: distance calculating module 15 for calculating a distance that represents a relationship between the unit space and the signal space; determining module 16 for determining presence/absence of a possibility of a failure of the gas turbine engine by using the distance calculated by the distance calculating module 15; and result data storage processing module 17 for storing a result of the determination in the storage device 30.

Moreover, the failure detection device 1A includes the storage device 30 that stores accumulated data D1, result data D2 and a failure detecting program P. For example, the failure detection device 1A is an information processing device including a CPU (central processing unit) 10, the storage device 30, the input/output module 40 and the like, and the failure detecting program P stored in the storage device 30 is executed, whereby the CPU 10 executes the processing while serving as the input data storage processing module 11, the correlation equation identifying module 12, the unit space generating processing unit 13, the signal space generating processing unit 14, the distance calculating module 15, the determining module 16, the result data storage processing module 17 and notifying module 18.

The input data storage processing module 11 associates the values of the respective sensors 2a to 2n, which are newly inputted to the input/output module 40 at timing when a predetermined condition is obtained, with one another, and adds the associated values to accumulated data D1 stored in the storage device 30. The timing when the predetermined condition is obtained is timing when the same or similar condition can be ensured for an inspection target. In the gas turbine engine 4 of the aircraft, a variety of conditions such as an outside air temperature, an altitude and a speed of an aircraft body differ in response to a flight condition during the flight of the aircraft, and the values measured by the sensors 2a to 2n are also influenced by these conditions. In contrast, at a moment of a takeoff, differences in conditions such as the outside air temperature, the altitude and the speed of the aircraft body are smaller in comparison with those during the flight, and the values of the sensors 2a to 2n are also less likely to depend on these conditions. Hence, here, the moment of the takeoff is defined as the "timing when a predetermined condition is obtained". Moreover, the description is made on the assumption that the input data storage processing module 11 uses sensor values inputted at the moment of the takeoff.

As an example is shown in FIG. 3, the accumulated data D1 is data in which acquisition date/time and the values measured by the respective sensors 2a to 2n are associated with each other. Moreover, the accumulated data D1 associates therewith a failure flag that is a determination result as to whether a failure is detected from the respective sensor values acquired simultaneously. For example, in the example shown in FIG. 3, it is understood that a failure is detected from the sensor value acquired at acquisition date/time "T3" in which the failure flag is "1".

For example, the input data storage processing module 11 does not add new sensor values and the failure flag to the accumulated data D1 at timing when the new sensor values are inputted to the input/output module 40, but adds only the sensor values first, and then adds the failure flag at subsequent timing when the determination result is obtained. As a matter of course, after the determination result is obtained, the input data storage module 11 may add the respective sensor values to the accumulated data D1 together with the failure flag.

The correlation equation identifying module 12 identifies a correlation equation between the value of the first sensor 2a and the value of the second sensor 2b, which are measured for a predetermined period. As mentioned above, the value of the first sensor 2a is the "inlet temperature of the gas turbine engine 4", and the value of the second sensor 2b is the "value of the inlet temperature of the compressor".

Specifically, when the value (inlet temperature of the gas turbine engine 4) of the first sensor 2a is defined as $T2a_{sig}$, and the value (inlet temperature of the compressor) of the second sensor 2b is defined as $T2b_{sig}$, the correlation equation identifying module 12 obtains a correlation equation that identifies coefficients a and b of Equation (1).

$$T2b_{sig} = a \cdot T2a_{sig} + b \tag{1}$$

As shown in FIG. 1, the unit space generating processing unit 13 includes: accumulated data nondimensionalizing module 13a; accumulated data adjusting module 13b; and unit space calculating module 13c.

The accumulated data nondimensionalizing module 13a extracts normal data in the value (inlet temperature of the compressor) of the second sensor 2b, which is measured for the predetermined period, from the accumulated data D1 stored in the storage device 30, and nondimensionalizes the extracted normal data by the value (inlet temperature of the gas turbine engine 4) of the first sensor 2a.

Here, the data measured for the predetermined period is, for example, data for an amount of a predetermined number of times (for example, for an amount of 50 times) excluding the data as the inspection target, which is included in the accumulated data D1. In the example shown in FIG. 3, in a case where the sensor value of the time Tn is latest data, and the sensor value acquired at this time Tn is the inspection target, then data for an amount of a predetermined number of times, which are acquired before the time Tn, are used. Here, a reason why the data for the amount of predetermined number of times in the latest data are used is that old data are sometimes changed by an influence of changes of the sensors 2a to 2n, the changes including an aged deterioration, a seasonal variation and the like, and accordingly, the latest data may be used in order to eliminate such an influence of the changes.

Moreover, in the example shown in FIG. 3, the normal data is data associated with a failure flag "0".

Note that the sensor values serving as targets of such nondimensionalization are values with the same units as those of the condition sensors, and are sensor values in which measurement values are affected by the condition sensor values.

Specifically, when a nondimensionalized value (inlet temperature of the compressor) of the second sensor 2b is defined as T2bnom, the accumulated data nondimensionalizing module 13a nondimensionalizes the extracted value of the second sensor 2b by using Equations (2-1) and (2-2) using the coefficients and be identified by the correlation equation identifying module 12.

$$T2b_{syn} = a \cdot T2a_{sig} + b \tag{2-1}$$

$$T2b_{nom} = T2b_{sig}/T2b_{syn} \tag{2-2}$$

The accumulated data adjusting module 13b extracts the normal data in the values of the respective sensors 2a to 2n, which are measured for the predetermined period, from the accumulated data D1 stored in the storage device 30, and adjusts values, which are affected by the value (inlet temperature of the gas turbine engine 4) of the first sensor 2a or the value (inlet pressure of the gas turbine engine 4) of the third sensor 2c among the values of the sensors other than the first sensor 2a to the third sensor 2c, by the value of the first sensor 2a, the value of the third sensor 2c, or the value of the first sensor 2a or the third sensor 2c.

Moreover, the normal data measured for the predetermined period is data extracted under similar conditions to those of the data extracted by the accumulated data nondimensionalizing module 13a.

Note that the sensor values serving as targets of the adjustment are values with units different from those of the values of the condition sensors, which are the sensor values in which the measurement values are affected by the condition sensor values.

Specifically, by using the temperature ($TTB_{sig}$) of the turbine blade surface, the temperature ($TG_{sig}$) of the exhaust gas, the compressor outlet pressure ($PC_{sig}$), the number of revolutions ($N1_{sig}$) of the low-pressure turbine, the number of revolutions ($N2_{sig}$) of the high-pressure turbine, and the fuel flow rate ($FF_{sig}$), which are thus extracted, an adjusted temperature ($TTB_c$) of the turbine blade surface, an adjusted temperature ($TG_c$) of the exhaust gas, an adjusted compressor outlet pressure ($PC_c$), an adjusted number of revolutions ($N1_c$) of the low-pressure turbine, an adjusted number of revolutions ($N2_c$) of the high-pressure turbine, and an adjusted fuel flow rate ($FF_c$) are obtained by Equations (3-1) to (3-6), respectively.

$$TTB_c = TTB_{sig}/\theta \tag{3-1}$$

$$TG_c = TG_{sig}/\theta \tag{3-2}$$

$$PC_c = PC_{sig}/\delta \tag{3-3}$$

$$N1_c = N1_{sig}/\sqrt{\theta} \tag{3-4}$$

$$N2_c = N2_{sig}/\sqrt{\theta} \tag{3-5}$$

$$FF_c = FF_{sig}/(\delta/\sqrt{\theta}) \tag{3-6}$$

Here, the respective coefficients are obtained in such a manner as follows.

$$\theta = T2a_{sig}/288.15$$

$$\delta = PA/101.3$$

$$PA = 101.3 \cdot (1+0.2Mn^2)^{3.5}$$

Mn: speed of aircraft (Mach Number)

Specifically, with regard to Equations (3-1) to (3-6), the temperature ($TTB_{sig}$) of the turbine blade surface, the temperature ($TG_{sig}$) of the exhaust gas, the number of revolutions ($N1_{sig}$) of the low-pressure turbine and the number of revolutions ($N2_{sig}$) of the high-pressure turbine are adjusted by the value (inlet temperature of the gas turbine engine 4) of the first sensor 2a. Moreover, the compressor outlet pressure ($PC_{sig}$) is adjusted by the value (inlet pressure of the gas turbine engine 4) of the third sensor 2c. Furthermore, the fuel flow rate ($FF_{sig}$) is adjusted by the value of the first sensor 2a and the value of the third sensor 2c.

Here, δ is not the value itself of the third sensor 2c, but a value obtained by using the value of the third sensor 2c. Specifically, from a "static pressure (ambient atmosphere static pressure)" that is a pressure in a state where an object is left still, and from a total pressure (full pressure)" which a moving object receives on a front thereof, δ is obtained by "total pressure/static pressure". Note that the total pressure is obtained by "static pressure+pressure generated by movement of object". Hence, δ is a value obtained by a ratio of the inlet pressure of the gas turbine engine 4 and the static pressure.

Note that the accumulated data adjusting module 13b may not adjust the sensor values such as an angle of a variable static blade and an opening degree of an air bleed valve, which are not affected by the inlet temperature of the gas turbine engine 4 and the inlet pressure of the gas turbine engine 4. In the above-mentioned example, the angle (XV) of the variable static blade and the opening degree (XB) of the air bleed valve are the sensor values that may not be adjusted.

Figure 4A:
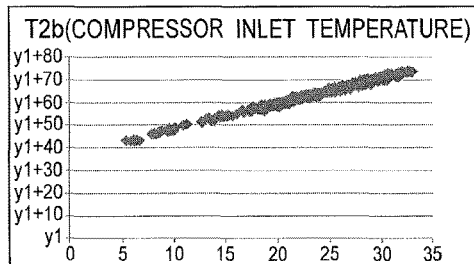
FIGS. 4A to 4G are examples of respective sensor values inputted by the failure detection device of FIG. 1.
Figure 4B:
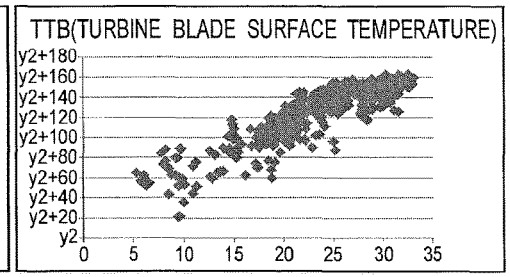
Figure 4C:
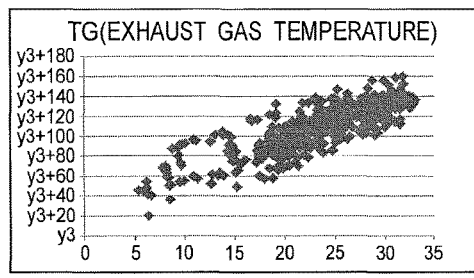
Figure 4D:
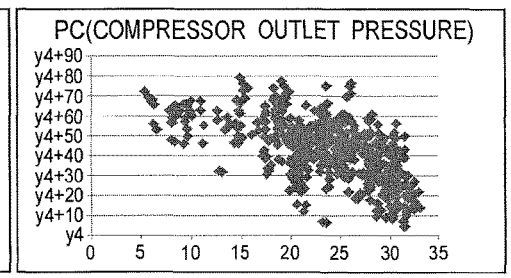
Figure 4E:
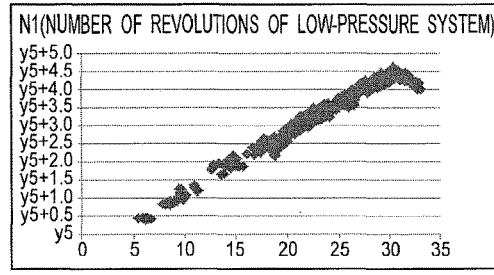
Figure 4F:
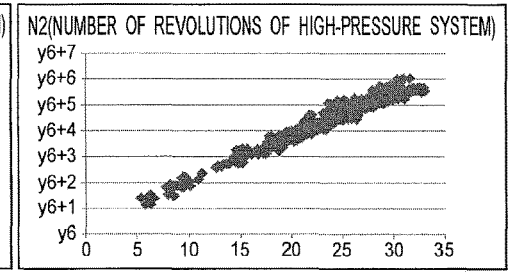
Figure 4G:
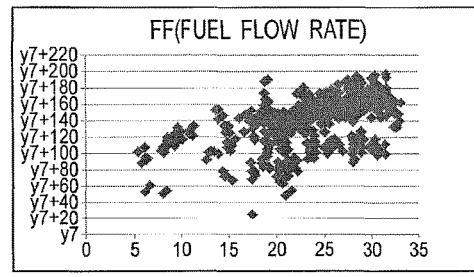

FIGS. 4A to 4G show graphs representing the respective sensor values before the nondimensionalization or the adjustment and the value (inlet temperature of the gas turbine engine 4) of the first sensor 2a. FIGS. 4A to 4 G show the values of the first sensor 2a, in which axes of ordinates are the values of the respective sensors. Specifically, FIG. 4A is a graph regarding the inlet temperature ($T2b_{sig}$) of the compressor, FIG. 4B is a graph regarding the temperature ($TTB_{sig}$) of the turbine blade surface, FIG. 4C is a graph regarding the temperature ($TG_{sig}$) of the exhaust gas, FIG. 4D is a graph regarding the compressor outlet pressure ($PC_{sig}$), FIG. 4E is a graph regarding the number of revolutions ($N1_{sig}$) of the low-pressure turbine, FIG. 4F is a graph regarding the number of revolutions ($N2_{sig}$) of the high-pressure turbine, and FIG. 4G is a graph regarding the fuel flow rate ($FF_{sig}$).

Figure 5A:
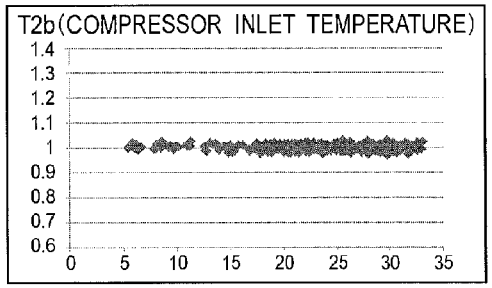
FIGS. 5A to 5G are examples of infinitizing or adjusting respective sensor values of FIGS. 4A to 4G in the failure detection device of FIG. 1.
Figure 5B:
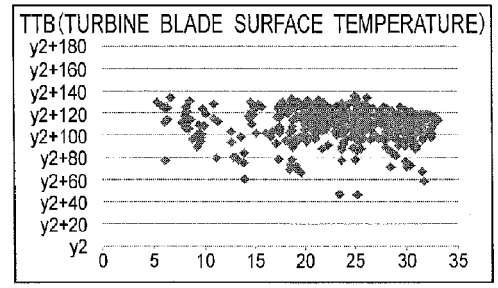
Figure 5C:
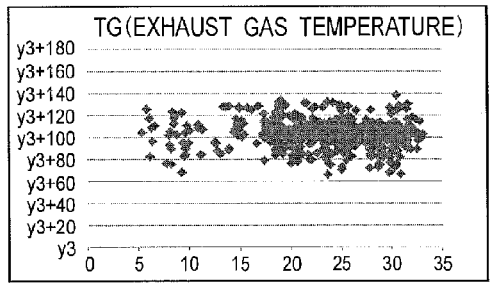
Figure 5D:
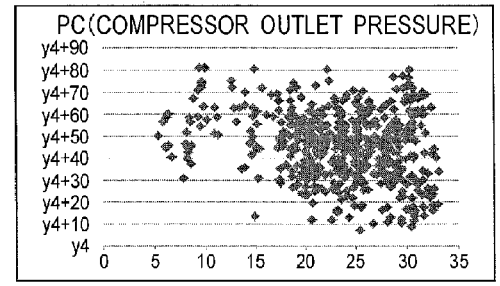
Figure 5E:
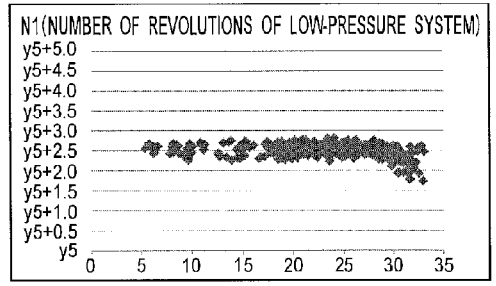
Figure 5F:
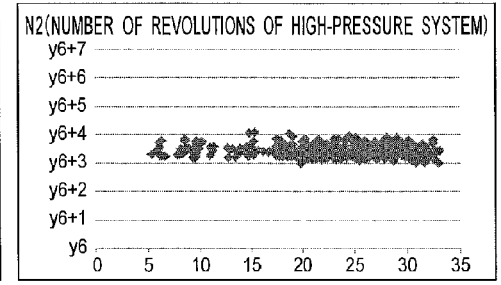
Figure 5G:
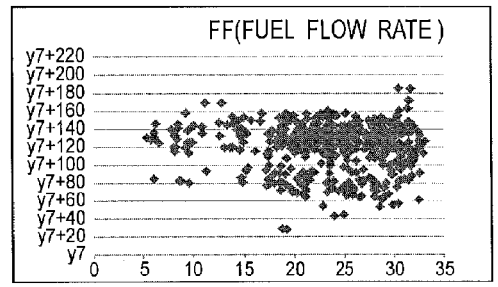

FIG. 5A is a graph of an inlet temperature ($T2b_{nom}$) of the compressor, which is obtained by nondimensionalizing the inlet temperature ($T2b_{sig}$) of the compressor, which is shown in FIG. 4A, by the accumulated data nondimensionalizing module 13a. In comparison with the graph shown in FIG. 4A, in the graph shown in FIG. 5A, the graph showing the value (compressor inlet temperature: $T2b_{nom}$) of the second sensor 2b, which is nondimensionalized, such an influence by the value (inlet temperature of the gas turbine engine 4) of the first sensor 2a is removed therefrom, the correlation thereof with that of the first sensor 2a is released, and variations thereof are reduced.

FIG. 5B to FIG. 5F are graphs of values ($TTB_c$, $TG_c$, $PC_c$, $N1_c$, $N2_c$, $FF_c$) obtained by adjusting the respective sensor values, which are shown in FIG. 4B to FIG. 4G, by the accumulated data adjusting module 13b. In comparison with the unadjusted sensor values shown in FIG. 4B to FIG. 4G, in the respective sensor values already adjusted by the inlet temperature or inlet pressure of the gas turbine engine 4, the respective sensor values being shown in FIG. 5B to FIG. 5G, such an influence by the inlet temperature or the inlet pressure is removed therefrom, the correlations thereof with the inlet temperature or the inlet pressure are released, and variations thereof are reduced.

The unit space calculating module 13c obtains the unit space by using the values of the respective sensors 2a to 2n, which are subjected to the predetermined processing. In the above-mentioned example, for the inlet temperature (T2b) of the compressor, the nondimensionalized value is used. Moreover, the adjusted values are used for the temperature (TTB) of the turbine blade surface, the temperature (TG) of the exhaust gas, the compressor outlet pressure (PC), the number of revolutions (N1) of the low-pressure turbine, the number of revolutions (N2) of the high-pressure turbine and the fuel flow rate (FF). Furthermore, the acquired sensor values are used for the inlet temperature (T2a) of the gas turbine engine 4, the angle (XV) of the variable static blade, and the opening degree (XB) of the air bleed valve.

As shown in FIG. 1, signal space generating processing unit 14 includes: input data nondimensionalizing module 14a; input data adjusting module 14b; and signal space calculating module 14c.

The input data nondimensionalizing module 14a nondimensionalizes the value (inlet temperature of the compressor) of the second sensor 2b, which is newly inputted to the input/output module 40 at the predetermined timing, by the value (inlet temperature of the gas turbine engine 4) of the first sensor 2a. Specifically, the input data nondimensionalizing module 14a nondimensionalizes the newly inputted value of the second sensor 2b by using Equations (2-1) and (2-2) used by the accumulated data nondimensionalizing module 13a. The predetermined timing is the timing when the same or similar conditions can be ensured for the above-mentioned inspection target, and as mentioned above, is the moment of the takeoff in the case of the sensor of the gas turbine engine 4.

The input data adjusting module 14b adjusts the values, which are affected by the value (inlet temperature of the gas turbine engine 4) of the first sensor 2a among the values of the sensors other than the first sensor 2a to the third sensor 2c in the values of the respective sensors 2a to 2n, the values being newly inputted by the input/output module 40 at the predetermined timing, by the value of the first sensor 2a and the value (pressure of the gas turbine engine 4) of the third sensor 2c. Specifically, the input data adjusting module 14b adjusts the newly inputted respective sensor values by using Equations (3-1) to (3-6) used by the accumulated data adjusting module 13b. Also in this case, the predetermined timing is the timing when the same or similar conditions can be ensured for the above-mentioned inspection target, and as mentioned above, is the moment of the takeoff in the case of the sensor of the gas turbine engine 4.

Note that, in a similar way to the accumulated data adjusting module 13b, the input data adjusting module 14b may not adjust the sensor values such as the angle of the variable static blade and the opening degree of the air bleed valve, which are not affected by the temperature and the pressure.

The signal space calculating module 14c obtains the signal space by using the values of the respective sensors 2a to 2n, which are subjected to the predetermined processing. This signal space is an aggregate of the respective sensor values taken as the inspection targets in the failure detection device 1A.

In the above-mentioned example, for the inlet temperature of the compressor, the nondimensionalized value is used. Moreover, the adjusted values are used for the temperature of the turbine blade surface, the temperature of the exhaust gas, the compressor outlet pressure, the number of revolutions of the low-pressure turbine, the number of revolutions of the high-pressure turbine and the fuel flow rate. Furthermore, the acquired sensor values are used for the inlet temperature of the gas turbine engine 4, the angle of the variable static blade, and the opening degree of the air bleed valve.

By using an equation defined by the error variance method, the distance calculating module 15 calculates an error variance distance between the unit space obtained by the unit space calculating module 13c and the signal space obtained by the signal space calculating module 14c.

Figure 7A:
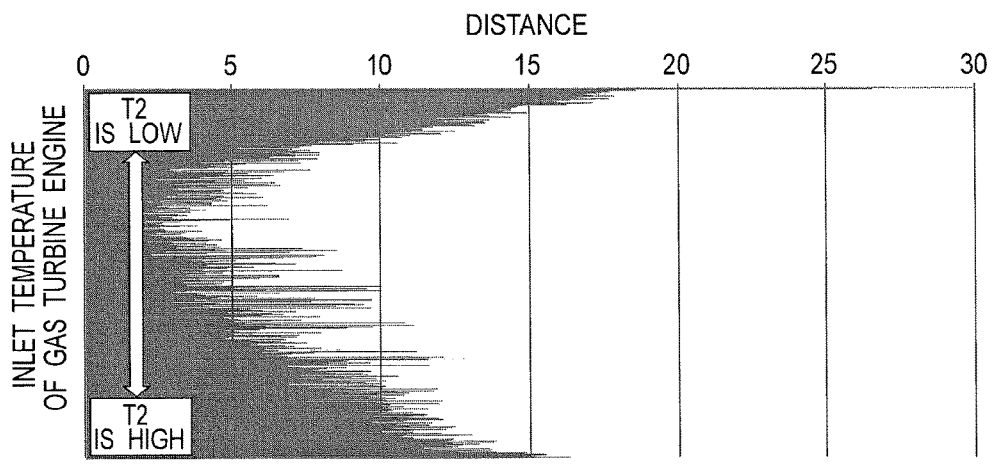
FIGS. 7A and 7B are views explaining an error variance distance obtained by the failure detection device of FIG. 1.

FIG. 7A is an example of the error variance distance obtained by using the un-nondimensionalized sensor value and the unadjusted sensor values, which are shown in FIGS. 4A to 4G. In FIG. 7A, an axis of abscissas is the error variance distance, and an axis of ordinates is the inlet temperature of the gas turbine engine 4. Here, FIG. 7A is an example of the error variance distance obtained from the values measured by using the normal sensors 2a to 2n, all of which are free from failure. As shown in FIG. 7A, the error variance distance, which is obtained by using the un-nondimensionalized sensor value and the unadjusted sensor values, is obtained in a range as wide as 2 to 27, and a threshold value thereof cannot help but being set to a large value. Therefore, as a situation, it has been difficult to detect a failure such as a drift failure, of which seriousness is low.

Figure 7B:
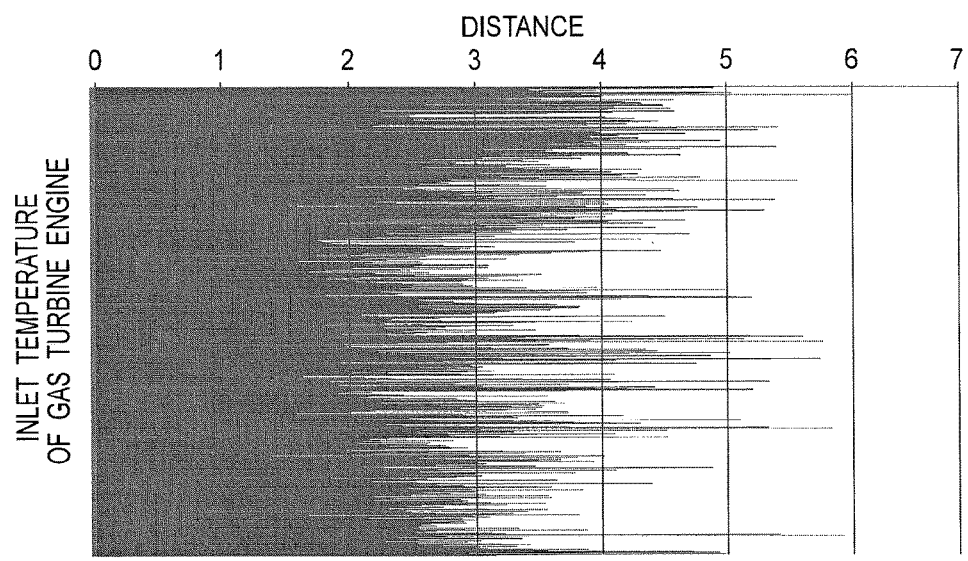

In contrast, FIG. 7B is an example of the error variance distance obtained by nondimensionalizing or adjusting the respective sensor values which are shown in FIGS. 5A to 5G and are used in FIG. 7A. Also in FIG. 7B, an axis of abscissas is the error variance distance, and an axis of ordinates is the inlet temperature of the gas turbine engine 4. In accordance with FIG. 7B, the range of the error variance distance obtained by using the nondimensionalized or adjusted sensor values is narrowed to approximately 1 to 6, and accordingly, the threshold value may not be set a large value. It is understood that it hence becomes easy to detect even the failure such as the drift failure, of which seriousness is low.

The determining module 16 compares the error variance distance, which is calculated by the distance calculating module 15, with the predetermined threshold value, and determines whether or not a failure occurs in any of the sensors.

The result data storage processing module 17 adds a failure flag as a target of the accumulated data D1 stored in the storage device 30, and stores a determination result of the determining module 16 in the result data D2 stored in the storage device 30.

The notifying module 18 transmits the determination result of the determining module 16 to the electronic control unit 3 of the aircraft. For example, the electronic control unit 3 that has received the determination result outputs the determination result to an output device (not shown), whereby a passenger of the aircraft and a person who maintains the aircraft can grasp the possibility of the sensor failure. Here, the notifying module 18 may output the determination result only in the case where there is a possibility of the failure.

Failure Detection Processing

Figure 6:
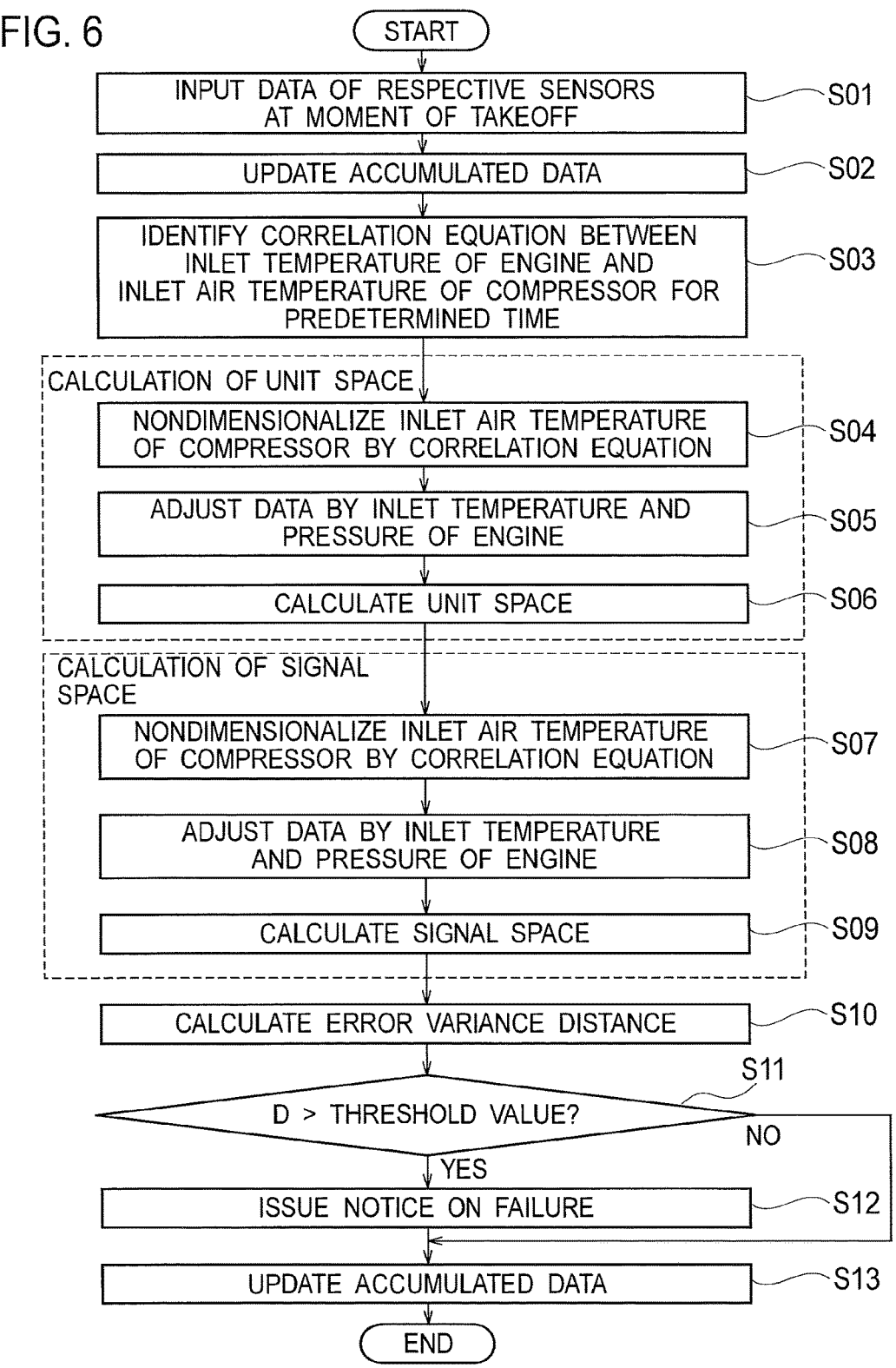
FIG. 6 is a flowchart explaining processing executed in the failure detection device of FIG. 1.

By using FIG. 6, a description is made of a flow of the processing in the failure detection device 1A. As shown in FIG. 6, to the failure detection device 1A, there are first inputted the data measured by the respective sensors 2a to 2n at the moment of the takeoff (S01).

When the data is inputted in Step S01, the failure detection device 1A updates the accumulated data D1 by adding the inputted data thereto (S02).

Moreover, the failure detection device 1A identifies a correlation equation between the inlet temperature (value of the first sensor 2a) of the gas turbine engine 4 for the predetermined period and the inlet temperature (value of the second sensor 2b) of the compressor for the predetermined period (S03).

When the data is inputted in Step S01, the failure detection device 1A takes this as timing to start the processing of the failure detection, and nondimensionalizes an inlet temperature (value of the second sensor 2b) of a normal compressor, which is included in the accumulated data D1 and is measured for the predetermined period, by using the correlation equation identified in Step S03 (S04).

Moreover, the failure detection device 1A adjusts the normal data, which is measured for the predetermined period among the data included in the accumulated data D1, by the inlet temperature (value of the first sensor 2a) of the gas turbine engine 4 or the inlet pressure (value of the third sensor 2c) thereof (S05).

Subsequently, the failure detection device 1A generates the unit space, which is for use in the MT system, by using the sensor value nondimensionalized in Step S04 and the sensor values adjusted in Step S05 (S06). Here, a series of the processing in Steps S04 to S06 is processing for calculating the unit space.

Moreover, the failure detection device 1A nondimensionalizes the inlet temperature (value of the second sensor 2b) of the compressor, which is inputted in Step S01, by using the correlation equation identified in Step S03 (S07).

Furthermore, the failure detection device 1A adjusts the data, which is inputted in Step S01, by the inlet temperature (value of the first sensor 2a) of the gas turbine engine 4 or the inlet pressure (value of the third sensor 2c) thereof (S08).

Subsequently, the failure detection device 1A generates the signal space, which is for use in the MT system, by using the sensor values subjected to the predetermined processing in Step S07 and Step S08 (S09). Here, a series of the processing in Steps S07 to S09 is processing for calculating the signal space.

Note that, in the flowchart shown in FIG. 6, the description is made on the assumption that the calculations (S07 to S09) of the signal space is executed after the calculations (S04 to S06) of the unit space; however, the order of the processing is not limited to this order. Specifically, the calculation of the unit space may be executed after the calculation of the signal space, or the calculation of the unit space and the calculation of the signal space may be executed simultaneously.

When the unit space and the signal space are calculated, the failure detection device 1A calculates the error variance distance between the unit space obtained in Step S06 and the signal space obtained in Step S09 (S10).

When the error variance distance is calculated in Step S10, the failure detection device 1A compares the calculated error variance distance with the predetermined threshold value, and determines whether or not there is a failure (S11).

When any of the sensors $2a$ to $2n$ may have caused a failure (YES in S11), the failure detection device 1A notifies the electronic control unit 3 that any of the sensors $2a$ to $2n$ may have caused a failure (S12).

Meanwhile, when any of the sensors $2a$ to $2n$ may have not caused a failure (NO in S11), or after such a notice is issued in Step S12, the failure detection device 1A updates the accumulated data D1 by adding a flag regarding a determination result thereto (S13).

Note that, here, the description is made on the assumption that the distance calculating module 15 calculates the error variance distance by using the error variance method of the MT system, and that the determining module 16 makes the determination by using the error variance distance; however, the failure detection processing is not limited to this. For example, the MT method may be used in place of the error variance method, and a Mahalanobis distance may be calculated for use in the determination.

As mentioned above, in accordance with the above-mentioned failure detection device 1A, in the event of detecting the sensor failure by using the MT method, the influence caused by the environment can be eliminated, and accordingly, even such a sensor drift failure, which appears by a slight change of the value, can be detected. In such a way, the detection accuracy of the sensor failure can be enhanced.

Second Embodiment

Figure 8:
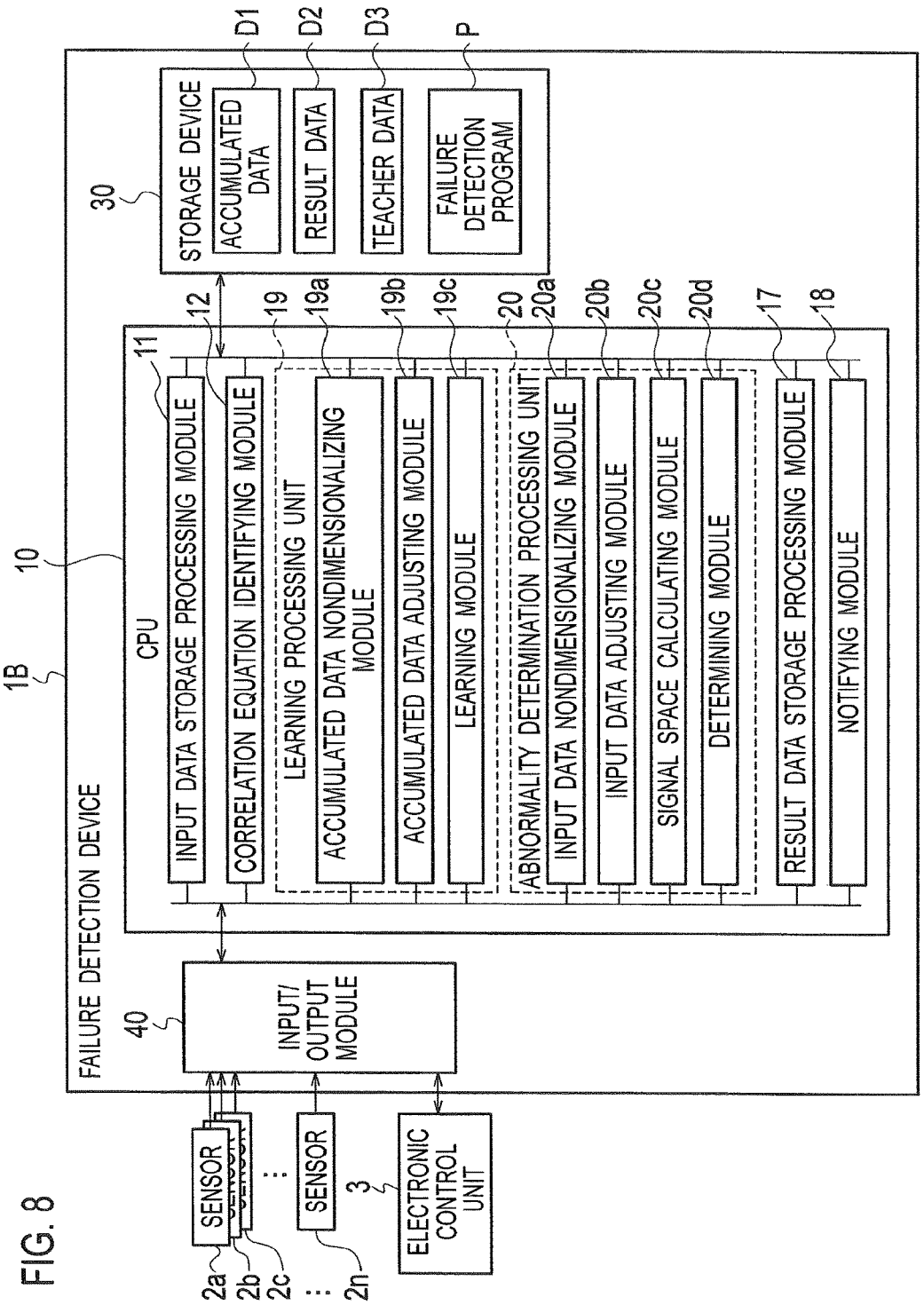
FIG. 8 is a block diagram explaining a failure detection device according to a second embodiment.

As shown in FIG. 8, a failure detection device 1B according to a second embodiment is also connected to the plurality of sensors $2a$ to $2n$ and the electronic control unit 3. This failure detection device 1B detects whether or not there are failures of the respective sensors $2a$ to $2n$ by using not the MT system but the neural network, and in addition, detects which of the sensors $2a$ to $2n$ may have caused a failure in a case where there is a failure.

In comparison with the failure detection device 1A mentioned above by using FIG. 1, the failure detection device 1B is different therefrom in not including the unit space generating processing unit 13, the signal space generating processing unit 14, the distance calculating module 15 and the determining module 16, but in including a learning processing unit 19 and an abnormality determination processing unit 20. Moreover, a storage device 30 of the failure detection device 1B stores teacher data D3 generated in the learning processing unit 19.

As shown in FIG. 8, the learning processing unit 19 includes: accumulated data nondimensionalizing module $19a$; accumulated data adjusting module $19b$; and learning module $19c$.

In a similar way to the accumulated data nondimensionalizing module $13a$ mentioned above by using FIG. 1, the accumulated data nondimensionalizing module $19a$ extracts normal data in the value (inlet temperature of the compressor) of the second sensor $2b$, which is measured for the predetermined period, from the accumulated data D1 stored in the storage device 30, and nondimensionalizes the extracted normal data by the value (inlet temperature of the gas turbine engine 4) of the first sensor $2a$.

In a similar way to the accumulated data nondimensionalizing module $13a$ mentioned above by using FIG. 1, the accumulated data adjusting module $19b$ extracts the normal data in the values of the respective sensors $2a$ to $2n$, which are measured for the predetermined period, from the accumulated data D1 stored in the storage device 30, and adjusts the values, which are affected by the value (inlet temperature of the gas turbine engine 4) of the first sensor $2a$ among the values of the sensors other than the first sensor $2a$ to the third sensor $2c$, by the value of the first sensor $2a$ and the value (pressure of the gas turbine engine) of the third sensor $2c$. Moreover, the accumulated data adjusting module $19b$ obtains relationships of the values of the other sensors $2b$ to $2n$ with respect to the value (inlet temperature of the gas turbine engine 4) of the first sensor $2a$.

In accordance with a learning program of the neural network, the learning module $19c$ generates the teacher data D3 by using the values of the respective sensors $2a$ to $2n$, which are subjected to the predetermined processing, and stores the generated teacher data D3 in the storage device 30. Specifically, the learning module $19c$ can obtain parameter values of elements, which are not obtained as the sensor values, by using the respective sensor values, which are adjusted by the accumulated data adjusting module $19b$, and using relationships among the respective sensors $2b$ to $2n$. Moreover, with regard to the respective sensor values and the obtained parameter values, the learning module $19c$ associates the values of the respective elements (sensor values or parameter values) and states (whether the respective elements are normal, or abnormal, or deteriorated) of the respective elements with each other, and stores the associated values and states as the teacher data D3 in the storage device 30.

For example, the teacher data D3 is data including a plurality of relationships as in the following (1) to (3).
(1) "Normal" in a case where a A value is "20", a B value is "18", and a C value is "290"
(2) "Normal" in a case where the A value is "35", the B value is "12", and the C value is "175"
(3) "Abnormal" in a case where the A value is "18", the B value is "23", and the C value is "225"
At this time, the A value and the B value may be the sensor values, and the C value may be the parameter value obtained by the learning processing.

Note that, at a "learning time", the learning module $19c$ generates the teacher data D3 by using data acquired in the past. At this time, the states associated with the respective elements are identified based on the past data. Moreover, the teacher data D3 generated at the learning time by the learning module $19c$ is used by the abnormality determination processing unit 20 for determining the possibility of the sensor failure at a "diagnosis time" during the flight.

In a case where a determination of "Abnormal" is made by using the teacher data D3, only the fact that a failure has occurred in any of the sensors is identifiable, and in order to grasp which of the sensors has failed, an algorithm may identify the failed sensor.

As shown in FIG. 8, the abnormality determination processing unit 20 includes: input data nondimensionalizing module $20a$; input data adjusting module $20b$; signal space calculating module $20c$; and determining module $20d$.

In a similar way to the input data nondimensionalizing module $14a$, the input data nondimensionalizing module $20a$ nondimensionalizes the value (inlet temperature of the compressor) of the second sensor $2b$, which is newly inputted to the input/output module 40 at the predetermined timing, by the value (inlet temperature of the gas turbine engine 4) of the first sensor $2a$.

In a similar way to the input data adjusting module $14b$ mentioned above by using FIG. 1, the input data adjusting module 20b adjusts values, which are affected by the value (inlet temperature of the gas turbine engine 4) of the first sensor 2a or the value (inlet pressure of the gas turbine engine 4) of the third sensor 2c among the values of the respective sensors 2a to 2n, the values being newly inputted to the input/output module 40 at the predetermined timing, by the value of the first sensor 2a, the value of the third sensor 2c, or the value of the first sensor 2a or the third sensor 2c.

In a similar way to the signal space calculating module 14c mentioned above by using FIG. 1, the signal space calculating module 20c obtains the signal space by using the values of the respective sensors 2a to 2n, which are subjected to the predetermined processing. This signal space is an aggregate of the respective sensor values taken as the inspection targets in the failure detection device 1B.

In accordance with an abnormality determination program of the neural network, the determining module 20d determines the possibility of the failure of each of the sensors 2a to 2n by using the teacher data D3, which is obtained by the learning module 19c, in response to whether or not the signal space obtained by the signal space calculating module 20c is abnormal. Specifically, when the A value "28", the B value "40" and the C value "160" are inputted, the determining module 20d determines the states thereof by using the teacher data D3 stored in the storage device 30.

Failure Determination Processing

By using FIG. 9, a description is made of a flow of the processing in the failure detection device 1B. As shown in FIG. 9, to the failure detection device 1B, there are first inputted the data measured by the respective sensors 2a to 2n at the moment of the takeoff (S21).

When the data is inputted in Step S21, the failure detection device 1B updates the accumulated data D1 by adding the inputted data thereto (S22).

Moreover, the failure detection device 1B identifies a correlation equation between the inlet temperature (value of the first sensor 2a) of the gas turbine engine 4 for the predetermined period and the inlet temperature (value of the second sensor 2b) of the compressor for the predetermined period (S23).

When the data is inputted in Step S21, the failure detection device 1B takes this as timing to start the processing of the failure detection, and nondimensionalizes an inlet temperature (value of the second sensor 2b) of a normal compressor, which is included in the accumulated data D1 and is measured for the predetermined period, by using the correlation equation identified in Step S23 (S24).

Moreover, the failure detection device 1B adjusts the normal data, which is measured for the predetermined period among the data included in the accumulated data D1, by the inlet temperature (value of the first sensor 2a) of the gas turbine engine 4 or the inlet pressure (value of the third sensor 2c) thereof (S25).

Subsequently, the failure detection device 1B executes the learning processing by the sensor value nondimensionalized in Step S24 and the sensor values adjusted in Step S25, and generates the teacher data (S26). Here, a series of the processing in Steps S24 to S26 is processing for executing the learning processing.

Thereafter, the failure detection device 1B nondimensionalizes the inlet temperature (value of the second sensor 2b) of the compressor, which is inputted in Step S21, by using the correlation equation identified in Step S23 (S27).

Moreover, the failure detection device 1B adjusts the data, which is inputted in Step S21, by the inlet temperature (value of the first sensor 2a) of the gas turbine engine 4 or the inlet pressure (value of the third sensor 2c) thereof (S28).

Furthermore, the failure detection device 1B generates the signal space by using the sensor value nondimensionalized in Step S27 and the sensor values adjusted in Step S28 (S29).

Subsequently, by using the states of the cases of the respective values, which are included in the teacher data D3 obtained by the learning processing in Step S26, the failure detection device 1B executes an abnormality determination of the signal space obtained in Step S29 (S30). Here, a series of the processing in Steps S27 to S30 is processing for executing the abnormality determination in the neural network.

When any of the sensors 2a to 2n may have caused a failure (YES in S31) in the abnormality determination in Step S30, the failure detection device 1B notifies the electronic control unit 3 that any of the sensors 2a to 2n may have caused a failure (S32).

Meanwhile, when any of the sensors 2a to 2n may have not caused a failure (NO in S31), or after such a notice is issued in Step S32, the failure detection device 1B updates the accumulated data D1 by adding a flag regarding a determination result thereto (S33).

As mentioned above, in accordance with the above-mentioned failure detection device 1B, in the event of detecting the sensor failure by using the neural network, the influence caused by the environment can be eliminated, and accordingly, even such a sensor drift failure, which appears by a slight change of the value, can be detected. In such a way, the detection accuracy of the sensor failure can be enhanced.

The description has been made above of the present disclosure in detail by using the embodiments; however, the present disclosure is not limited to the embodiments described in this specification. The scope of the present disclosure is determined by the scope of claims and by an equilibrium scope to the description of the scope of claims.

What is claimed is:

1. A failure detection device comprising:
   an input module that receives values measured by a plurality of sensors that are failure detection targets;
   an accumulated data storage unit that stores a plurality of sensor values that were acquired in past as accumulated data;
   a unit space generating module that extracts sensor values of a unit space that are used in an MT system from the accumulated data storage unit, for extracted sensor values, uses values as they are for condition sensor values defined as sensor values that affect other sensor values and sensor values that are not affected by the condition sensor values, uses values nondimensionalized by the condition sensor values or values adjusted by the condition sensor values for the other sensor values affected by the condition sensor values, and thereby generates a unit space;
   a signal space generating module that, upon inputting a plurality of sensor values that are the failure detection targets to the input module, uses values as they are for the condition sensor values and the sensor values that are not affected by the condition sensor values, uses values nondimensionalized by the condition sensor values or values adjusted by the condition sensor values for the other sensor values, and thereby generates a signal space that is an aggregate of diagnosis data that are used in the MT system; and
   a determining module that compares a distance that represents a relationship between the unit space generated by the unit space generating module and the signal space generated by the signal space generating module with a predetermined threshold value, and determines presence/absence of a possibility of a failure of any of the sensors.

2. The failure detection device according to claim 1, further comprising:
a notifying module that issues a notice on a determination result of the determining module.

3. The failure detection device according to claim 1, further comprising:
an input data storage processing module that adds a new value of the sensor that is inputted to the input module to accumulated data of the accumulated data storage unit.

4. A failure detection device comprising:
an input module that receives values measured by a plurality of sensors provided in a gas turbine engine of an aircraft;
an accumulated data storage unit that stores values that are measured by the plurality of sensors at a moment of a takeoff of the aircraft as accumulated data;
a correlation equation identifying module that identifies a correlation equation between a value of a first sensor that measures an inlet temperature of the gas turbine and a value of a second sensor that measures an inlet temperature of a compressor, both of the values being stored in the accumulated data storage unit;
an accumulated data nondimensionalizing module that nondimensionalizes the value of the second sensor that is stored in the accumulated data storage unit by the correlation equation identified by the correlation equation identifying module;
an accumulated data adjusting module that individually adjusts values of sensors that are affected by the value of the first sensor by a value of the first sensor that is measured simultaneously therewith for respective sensor values stored in the accumulated data storage unit;
a unit space calculating module that calculates a unit space that is used for an MT system by using respective values of the second sensor that are nondimensionalized by the accumulated data nondimensionalizing module and values of the respective sensors that are adjusted by the accumulated data nondimensionalizing module together with the respective values stored in the accumulated data storage unit;
an input data nondimensionalizing module that nondimensionalizes values of the second sensor that are newly inputted to the input module by the correlation equation identified by the correlation equation identifying module;
an input data adjusting module that adjusts the values of the sensors that are affected by the value of the first sensor by a newly inputted value of the first sensor for the respective sensor values newly inputted to the input module;
a signal space calculating module that calculates a signal space that is an aggregate of diagnosis data that are used in the MT system by using the values of the second sensor that are nondimensionalized by the input data nondimensionalizing module and the values of the respective sensors that are adjusted by the input data nondimensionalizing module together with the respective values newly inputted to the input module; and
a determining module to compare a distance that represents a relationship between the unit space calculated by the unit space calculating module and the signal space calculated by the signal space calculating module with a predetermined threshold value and determines presence/absence of a possibility of a failure of any of the sensors.

5. A failure detection device comprising:
an input module that receives values measured by a plurality of sensors which are failure detection targets;
an accumulated data storage unit that stores a plurality of sensor values that were acquired in past as accumulated data;
a learning module that, for sensor values extracted as the teacher data of the neural network from the accumulated data storage unit, uses values as they are for condition sensor values defined as sensor values that affect other sensor values and sensor values that are not affected by the condition sensor values, uses values nondimensionalized by the condition sensor values or values adjusted by the condition sensor values for the other sensor values affected by the condition sensor values, and thereby obtains teacher data that includes values of a plurality of sensors and states of the respective sensors by a learning program of a neural network; and
a determining module that, upon inputting a plurality of sensor values that are the failure detection targets to the input module, for input sensor values, uses values as they are for the condition sensor values and values that are not affected by the condition sensor values, uses values nondimensionalized by the condition sensor values or values adjusted by the condition sensor values for the other sensor values affected by the condition sensor values, generates a signal space that is an aggregate of diagnosis target data, and determines presence/absence of a possibility of a failure of any of the sensors in response to whether the values of the respective sensors in the generated signal space apply to a relationship obtained by the learning module.

6. A failure detection device comprising:
an input module that receives values measured by a plurality of sensors provided in a gas turbine engine of an aircraft;
an accumulated data storage unit that stores values that are measured by the plurality of sensors at a moment of a takeoff of the aircraft as accumulated data;
a correlation equation identifying module that identifies a correlation equation between a value of a first sensor that measures an inlet temperature of the gas turbine and a value of a second sensor that measures an inlet temperature of a compressor, both of the values being stored in the accumulated data storage unit;
an accumulated data nondimensionalizing module that nondimensionalizes the value of the second sensor that is stored in the accumulated data storage unit by the correlation equation identified by the correlation equation identifying module;
an accumulated data adjusting module that, for respective sensor values stored in the accumulated data storage module, individually adjusts values of sensors that are affected by the value of the first sensor by a value of the first sensor that is measured simultaneously therewith and in addition obtains relationships between the value of the first sensor and the values of the respective sensors;
a learning module that obtains teacher data that include values of a plurality of sensors and states of the respective sensors by a learning program of a neural network by using values of the respective sensors stored in the accumulated data storage unit, respective values of the second sensor that are nondimensionalized by the accumulated data nondimensionalizing module, and values of the respective sensors that are adjusted by the accumulated data adjusting module;

an input data nondimensionalizing module that nondimensionalizes a value of the second sensor that is newly inputted to the input module by the correlation equation identified by the correlation equation identifying module;

an input data adjusting module that adjusts, for the respective sensor values newly inputted to the input module, the values of the sensors that are affected by the value of the first sensor by a newly inputted value of the first sensor;

a signal space calculating module that calculates a signal space that is an aggregate of diagnosis data by using the values of the second sensor that are nondimensionalized by the input data nondimensionalizing module, and the values of the respective sensors that are adjusted by the input data nondimensionalizing module, together with the respective values newly inputted to the input module; and a determining module that compares the values of the respective sensors in the signal space that are calculated by the signal space calculating module with the teacher data obtained by the learning module, and determining presence/absence of a possibility of a failure of any of the sensors.

* * * * *